United States Patent [19]
Suzuki et al.

[11] Patent Number: 5,471,385
[45] Date of Patent: Nov. 28, 1995

[54] ROUTELESS GUIDING METHOD FOR MOVING BODY

[75] Inventors: Kenshi Suzuki, Takatsuki; Kazuhiro Shibatani, Izumiotsu; Hisao Nishii, Osaka, all of Japan

[73] Assignee: Tsubakimoto Chain Co., Osaka, Japan

[21] Appl. No.: 55,215

[22] Filed: Apr. 28, 1993

[30] Foreign Application Priority Data

May 21, 1992 [JP] Japan .................................. 4-155800

[51] Int. Cl.⁶ .................................................. G01C 21/10
[52] U.S. Cl. ...................... 364/424.02; 318/587; 180/168
[58] Field of Search ..................... 364/424.02, 424.01; 318/587, 567, 568.12; 180/169, 168, 167

[56] References Cited

U.S. PATENT DOCUMENTS

| | | | |
|---|---|---|---|
| 4,119,900 | 10/1978 | Kremnitz | 318/587 |
| 4,852,677 | 8/1989 | Okazaki | 180/169 |
| 4,939,650 | 7/1990 | Nishikawa | 364/424.02 |
| 4,939,651 | 7/1990 | Onishi | 364/424.02 |
| 5,029,088 | 7/1991 | Minami | 364/424.02 |
| 5,073,749 | 12/1991 | Kanayama | 318/587 |
| 5,153,833 | 10/1992 | Gordon et al. | 364/424.02 |
| 5,170,352 | 12/1992 | McTamaney et al. | 364/424.02 |
| 5,229,941 | 7/1993 | Hattori | 364/424.02 |
| 5,233,526 | 8/1993 | Detriche et al. | 364/424.02 |
| 5,281,901 | 1/1994 | Yardley et al. | 318/587 |

*Primary Examiner*—Kevin J. Teska
*Assistant Examiner*—Russell W. Frejd
*Attorney, Agent, or Firm*—Darby & Darby

[57] ABSTRACT

A routeless guiding method for guiding a moving body, in which the driving speeds of the body's right and left driving wheels are independently controlled according to an operational expression including parameters based on a positional relation between the body's present position and a target position to guide the body to a target position without designating a route. To guide the body, the gain of an azimuth deviation parameter related to a traveling direction of the moving body to the target position is changed in response to the distance between the moving body and the target position, and further the gain is made to be of two kinds so that the traveling route of the moving body is not unstable in shifting from one gain to another.

4 Claims, 14 Drawing Sheets

ROUTELESS GUIDING METHOD FOR MOVING BODY

BACKGROUND OF THE INVENTION

1. Field of the Invention

This invention relates to a routeless guiding method for moving bodies such as a working robot, carrier vehicle and the like, particularly a moving body such as the so-called two-wheel independent type moving robot having driving wheels used commonly for traveling and steering by driving right and left wheels independently without designating a route to the destination.

2. Description of Related Art

A moving body such as a working robot or a carrier vehicle for carrying materials and the like which controls traveling speed and steering by arranging driving wheels capable of being driven independently at right and left sides respectively and controlling the respective rotational speeds of the driving wheels, is already put to practical use. In such a moving body, guiding to a target position and controlling of the direction to the target position are carried out by controlling the rotational speeds of the right and left driving wheels according to the following equation (1).

$$u_{r,l} = k_y e_y \pm k_c (e_c - k_x e_x) \quad \ldots (1)$$

Here, $u_r$: right motor speed command value $u_l$: left motor speed command value $k_y$: traveling direction gain $k_c$: azimuth gain $k_x$: lateral direction gain $e_y$: traveling direction deviation $e_c$: turning direction deviation $e_x$: lateral direction deviation FIG. 1 is a schematic diagram showing an example in which the above-mentioned equation is applied. In FIG. 1, the reference symbol 1 designates a moving body. This moving body 1, as mentioned before, has independent driving wheels RW and LW at the right and left sides. The central position designated by a black point indicates the present position PP of the moving body 1. The target position TP of the moving body 1 is shown as an origin of x-y orthogonal coordinate, which represents a generally planar horizontal surface and the desired designated direction of the moving body 1 at the target position TP is the forward direction of y axis, as shown by an arrow DD. In FIG. 1, reference character $e_d$ shows a positional deviation (distance in a straight line) between the present position PP of the moving body 1 and the target position TP.

In the example shown in FIG. 1, the moving body 1 is guided to a dummy target position DTP according to equation (1). But when the value of $k_x e_x$ in the equation (1) exceeds $\pi/2$, the body cannot arrive at the target position TP. Therefore it is necessary that many intermediate points be set on the preset route and that a follow-up control system is configured to give these intermediate points as momentary target positions. In other words, it is necessary to preset a traveling route of the moving body 1.

Accordingly, when the moving body 1 is moved between n points, it is possible to set $nX(n-1)$ routes and it is necessary to describe all of these routes in a program. And when the number of the intermediate points of each route is m, each route is separated into (m+1) sections, and each section is indicated by the coordinates of two points at the both ends of the section. Accordingly, it is necessary to preset all of these coordinates to describe a program.

The traveling route set in the above-mentioned case is guided to coincide with the direction DD in which the traveling direction of the moving body 1 is preset when it reaches the target position TP. This is done by setting a combination of straight lines and circular arcs through an operator's hand. The body also can be guided to coincide with the desired travel direction DD of the moving body 1 at the target position TP, by generating spline curves which smoothly connect the starting point and target position TP of the moving body 1 by a control unit mounted on the moving body 1 itself.

But follow-up control, by a user program for setting the traveling route of a combination of straight lines and circular arcs through an operator's hand is complicated, and the program workload is enormous. And there is also a problem that the load of a CPU is very large to calculate spline curves when the moving body 1 calculates spline curves by a control circuit of the moving body 1 itself to travel.

SUMMARY OF THE INVENTION

The present invention has been devised in consideration of such circumstances, and the object thereof is to provide a routeless guiding method for a moving body, by which the moving body is guided to a target position without designating a route to the target position. The present invention eliminates setting of above-mentioned user program and calculation load of spline curves by the CPU.

The routeless guiding method for a moving body according to a first embodiment of the present invention is one which guides to a target position without designating a route a moving body whose driving speeds of its right and left driving wheels are controlled independently according to operation expression including a parameter based on a positional relation between the present position and the target position. This includes changing a gain of the parameter included in the operation expression according to a distance between the present position and the target position of the moving body.

According to such a routeless guiding method for a moving body related to the first embodiment of the present invention, different controllings according to the distances between the present position and the target position become possible. For example, when the moving body is relatively far from the target position, it goes straight to the target position and as the moving body approaches the target position, it is guided to a traveling direction in accord with the direction of the moving at the target position.

The routeless guiding method for a moving body related to a second embodiment of the present invention is one which the body guides to a target position without designating a route by independently controlling driving speeds of the right and left driving wheels according to operation expression including a parameter based on a positional relation between the present position and the target position. This embodiment makes the traveling direction of the moving body be in accord with the predetermined direction at the target position and includes changing a gain of the parameter included in the operation expression according to a distance between the present position and the target position of the moving body as well as by making two different types of gain so that the traveling route of the moving body in shifting from one gain level to another is not unstable, the gains of the parameters being of two kinds.

According to such a routeless guiding method for a moving body related to the second embodiment, different controllings according to the distances between the present position and the target position become possible. For example, when the moving body is relatively far from the target positions, it goes straight to the target position and as the moving body approaches the target position, it is guided to a traveling direction being in accord with the direction of the moving at the target position. Further, in addition to the above-mentioned first embodiment, it is possible to travel the moving body smoothly since the two different parameter gains are decided respectively so that the traveling route of the moving body at switching from one gain type to another is not unstable, the gains of the parameter being of two different types for the purpose of improving the accuracy of the direction control at the target position in the case where the starting position of the moving body is close to the target position.

The above and further objects and features of the invention will more fully be apparent from the following detailed description with accompanying drawings.

DESCRIPTION OF THE PREFERRED EMBODIMENTS

In the following, description will be made on the present invention referring to drawings showing the embodiments thereof.

Figure 1:
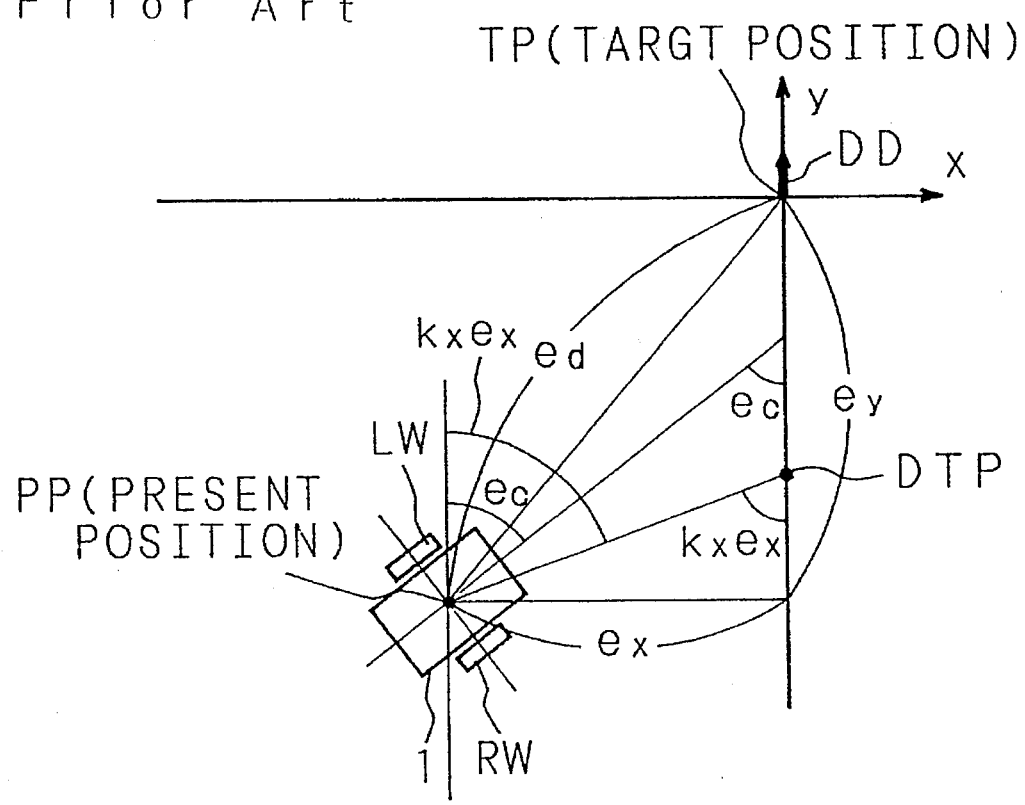
FIG. 1 is a schematic diagram explanatory of different kinds of deviations between the present position and the target position of the moving body and of a concept of the conventional guiding method for the moving body.
Figure 2:
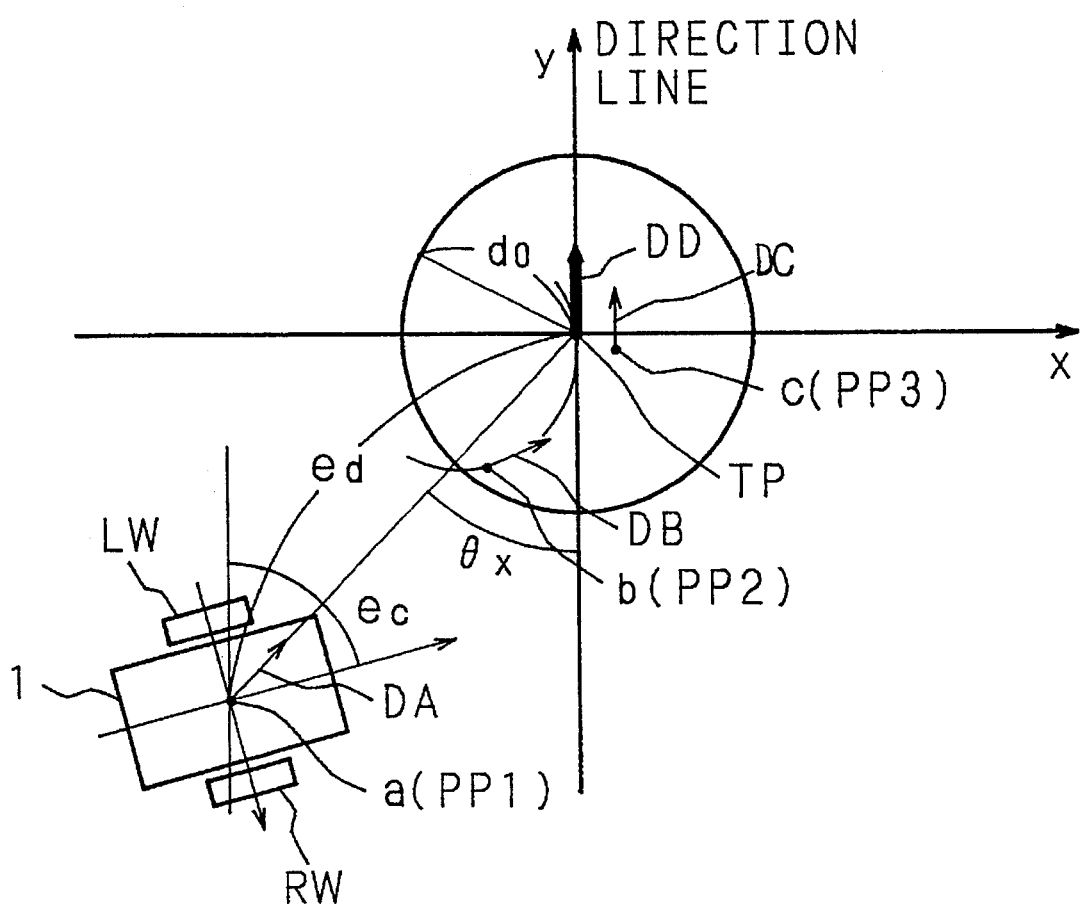
FIG. 2 is a schematic diagram showing a concept of a routeless guiding method for the moving body related to the first embodiment of the present invention.

FIG. 2 is a schematic diagram explanatory of the concept of the routeless guiding method for the moving body related to the first embodiment of the present invention. Three kinds of controllings are carried out responsive to a distance between the moving body 1 and the target position TP. The three kinds of controllings are respectively performed: (1) in the first case where the present position PP of the moving body 1 is far enough from the target position TP as shown by a point a in FIG. 2 (the present position of the moving body 1 is assumed to be PP1), (2) in the second case where the present position PP of the moving body 1 is close to the target position TP to a certain degree as shown by a point b in FIG. 2 (the present position of the moving body 1 is assumed to be PP2), and (3) in the third case where the present position PP of the moving body 1 is extremely close to the target position TP as shown by a point c in FIG. 2 (the present position of the moving body 1 is assumed to be PP3).

An explanation follows. In addition, in FIG. 2, the designated direction of the traveling direction of the moving body 1 from the target position TP is assumed to be the positive direction of the y axis as shown by the arrow DD.
[The first case]

The moving body 1 is assumed to be positioned at the point a. In such a case where the present position a of the moving body 1 is far enough from the target position TP, the moving body 1 is controlled to go straight to the target position TP as shown by an arrow DA.
[The second case]

In the case where the present position b of the moving body 1 is moderately close to the target position TP to a certain degree, a curve that passes through the present position b and comes in contact with y axis being the designated direction at the target point TP is set. The moving body 1 is controlled to move along this set curve as shown by an arrow DB.
[The third case]

In the case where the present position c of the moving body 1 is extremely close to the target position TP, even if the present position c is shifted a little from the target position TP, it is controlled to advance to the direction of y axis being the designated direction, as shown by an arrow C.

The routeless guiding method for the moving body related to the first embodiment continuously and smoothly carries out controllings of such three states as the first case where the present position of the moving body 1 is far enough from the target position TP, the second case where it is moderately close to the target position TP, and the third case where it is extremely close to the target position TP.

The speed command values of the motors of the right and left driving wheels of the moving body 1 in the first embodiment is obtained by the following equation (2).

$$u_{u,l} = k_d e_d \pm k_c (e_c - A\theta_x) \quad \ldots (2)$$

Here, $e_d$: positional deviation $\theta_x$: azimuth deviation $u_r$: right motor speed command value $u_l$: left motor speed command value $k_c$: azimuth gain $k_d$: deviation direction gain $e_c$: turning direction deviation A: azimuth deviation gain In addition, the positional deviation $e_d$ and azimuth deviation $\theta_x$ are given by the following equations (3) and (4).

$$e_d = \sqrt{e_x^2 + e_y^2} \qquad (3)$$

$$\theta_x = \tan^{-1}(e_x/e_y) \qquad (4)$$

The azimuth deviation gain A in equation (2) is given as a continuous function D which satisfies, as an example, the following equation (5) in the aforesaid first case, the following equation (6) in the second case and the following equation (7) in the third case respectively. In addition, when the azimuth deviation gain A is set as the function D which satisfies such equation (5), (6) or (7), the moving body 1 is controlled so as to move along a curve in the aforesaid case.

Figure 3:
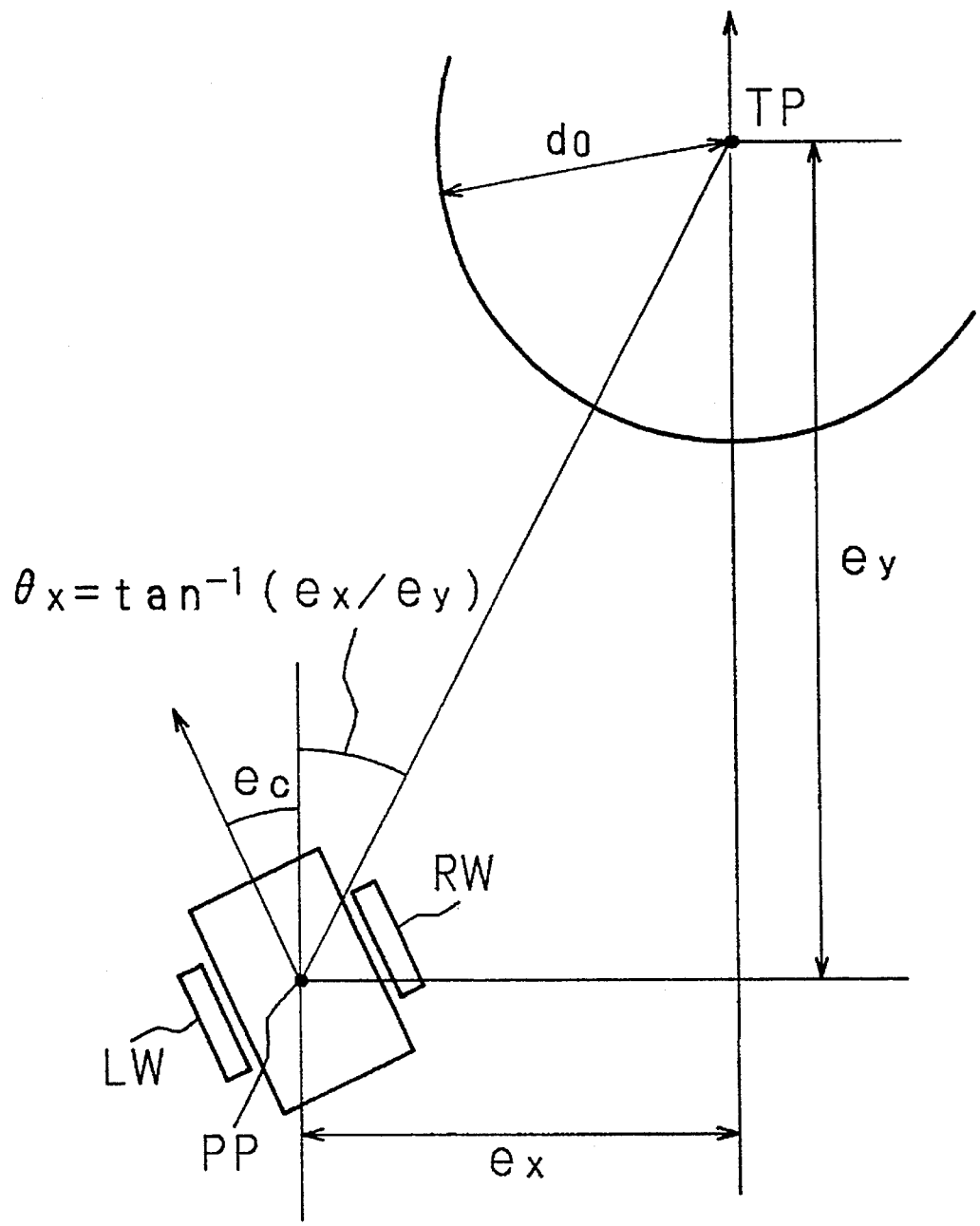
FIG. 3 is a schematic diagram showing that the direction deviation gain A becomes 1 (A=1) in a first case, in the method for routeless guiding method for the moving body related to the first embodiment.

When D>>1 (refer to FIG. 3):A=1 ... (5)

Figure 4:
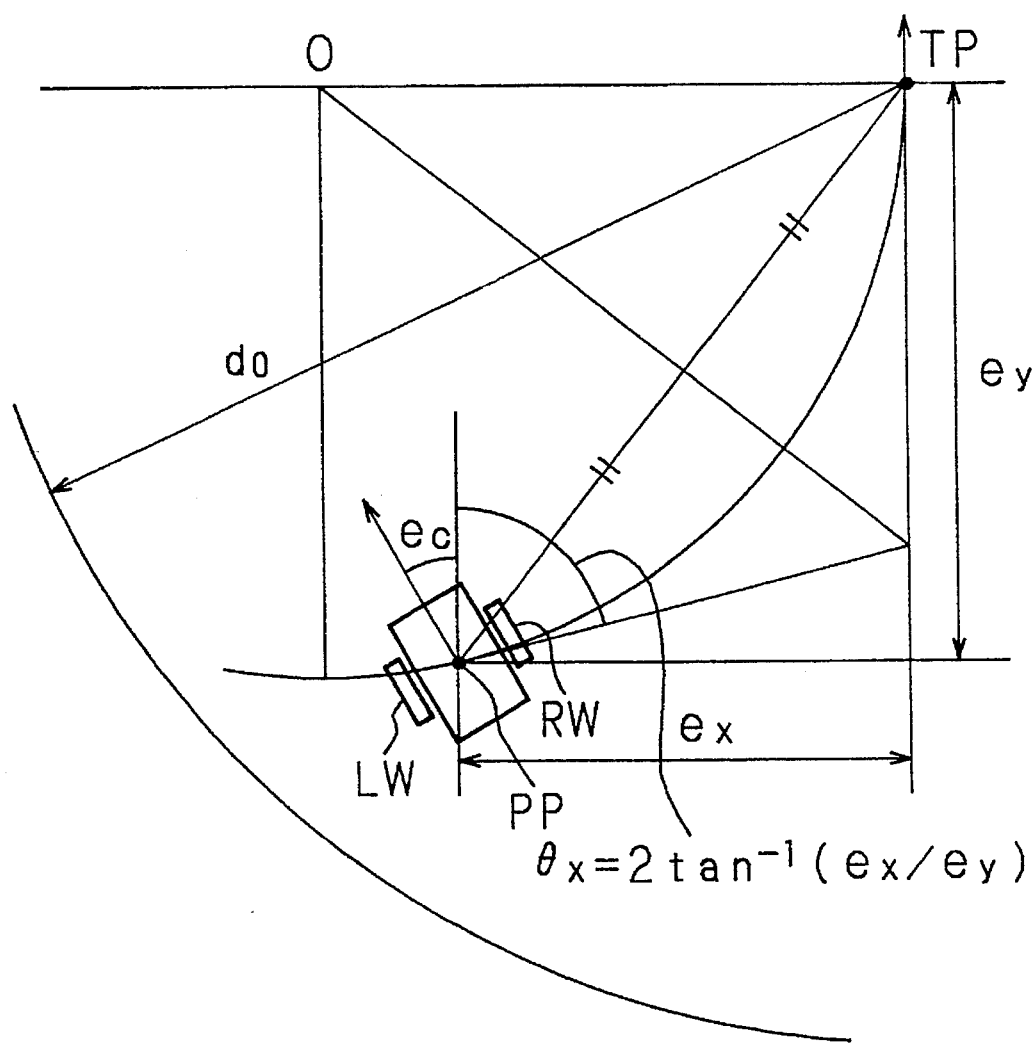
FIG. 4 is a schematic diagram showing that the direction deviation gain A becomes 2 (A=2) in a first case related to the first embodiment.

When D=1 (refer to FIG. 4):A=2 ... (6)

When D≡1:A=0 ... (7)

here, D:$e_d/d_0$ $d_0$: design parameter

Figure 5:
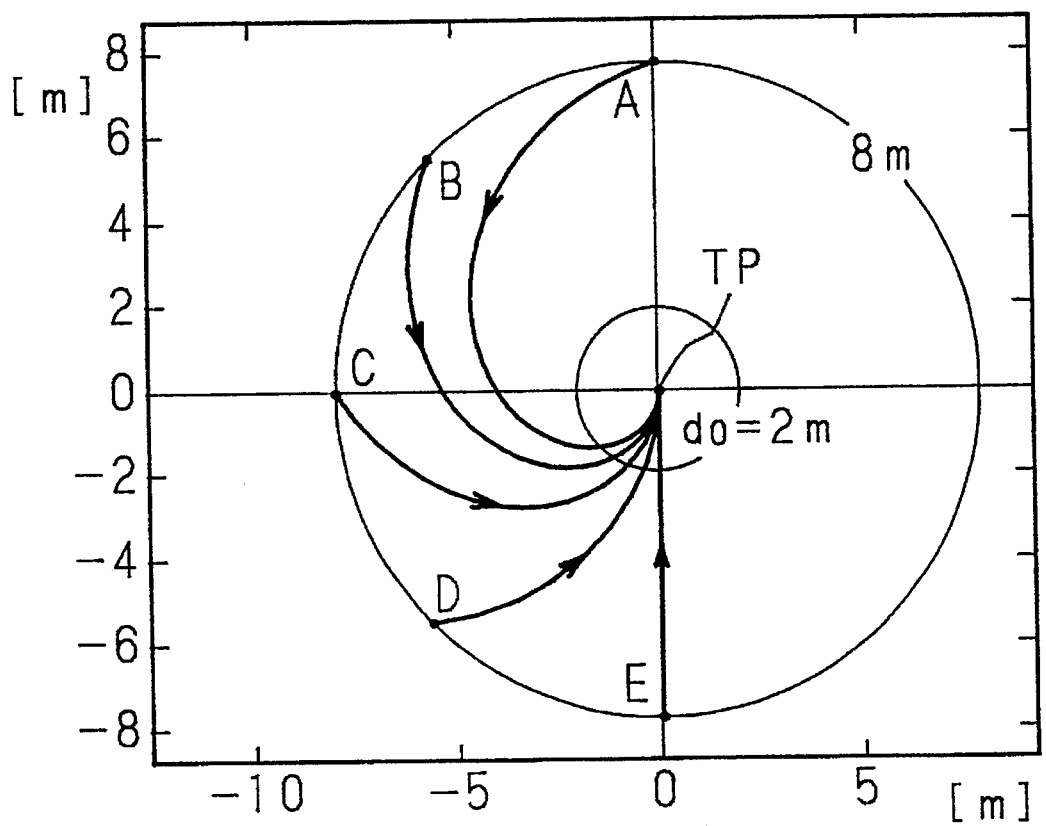
FIG. 5 is a graph showing the simulation result of the method for the routeless guiding for the moving body related to the first embodiment.
Figure 6:
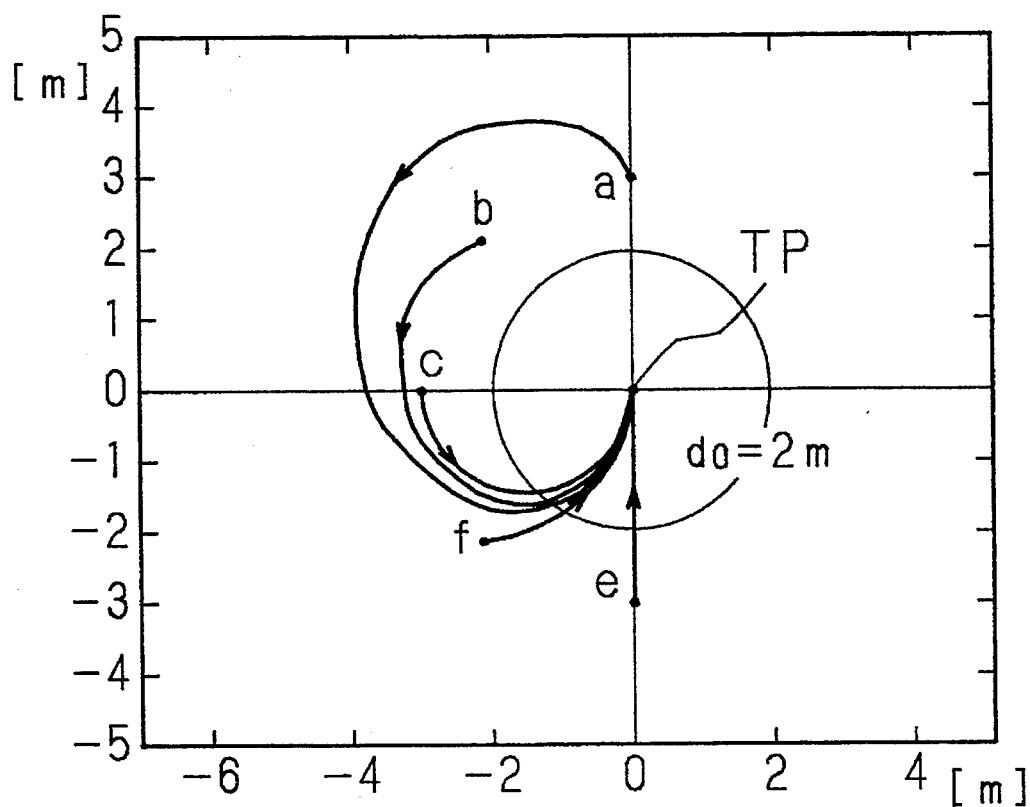
FIG. 6 is a graph showing the examination result of the method for the routeless guiding method for the moving body related to the first embodiment.

The simulation result and the examination result according to equation (2) are shown in FIG. 5 and FIG. 6 respectively.

The graph shown in FIG. 5 is the simulation result of the case where the traveling direction of the moving body 1 at the target position TP is 0° (right above) and the points A, B, C, D and E, which are separated from the target position TP by 8 meters and whose directions viewed from the target position TP are 0°, 45°, 90°, 135° and 180° respectively, are the starting positions, and at the respective starting positions A, B, C, D and E, the traveling direction of the moving body 1 is the right above direction an, further $d_0$ is 2 meters.

The graph shown in FIG. 6 is the examination result showing the actual traveling locus of the moving body 1 in the case were the distance between the starting position a, b, c, d and e of the moving body 1 and the target position TP is 3 meters compared with the above-mentioned case of A, B, C, D and E.

From an examination of these results, it is understood that the moving body 1 arrives exactly at the target position TP and the traveling direction at that time coincides with the designated direction.

Figure 7:
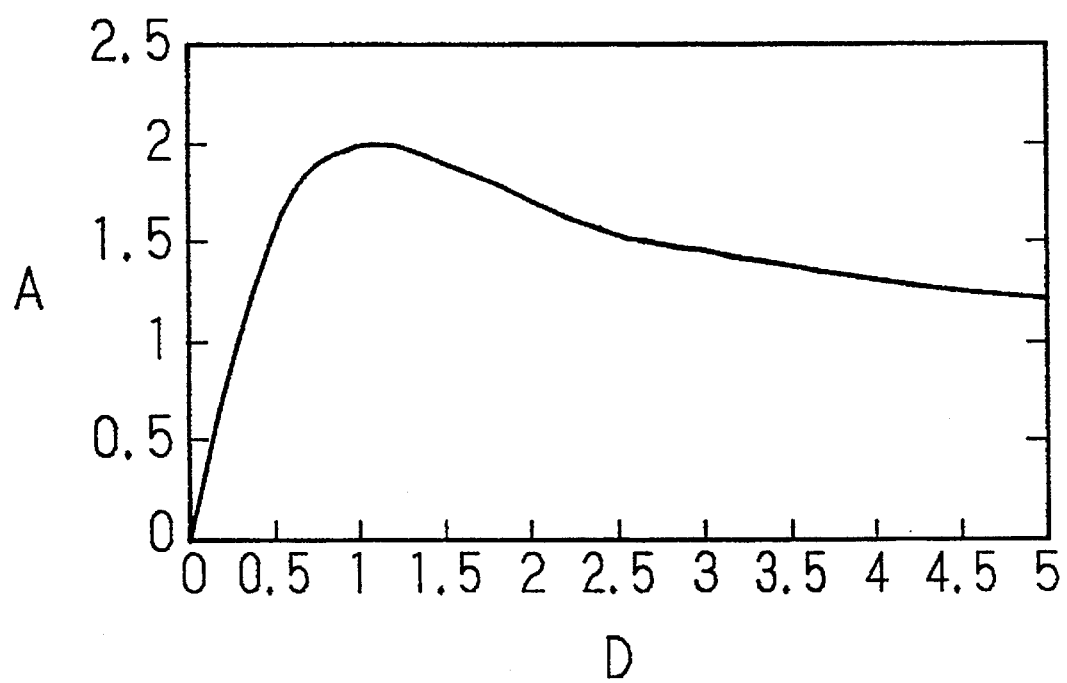
FIG. 7 is a graph showing a characteristic of the continuous function of the direction deviation gain A used in the above-mentioned simulation and examination.

As the continuous function of the azimuth deviation gain A in this case, the following equation (8) is used. In addition, the characteristics with respect to the continuous function D of the azimuth deviation gain A is shown in the graph in FIG. 7.

$$A = \frac{D\sqrt{15 + D^2}}{1 + D^2} \qquad (8)$$

The respective constants are as follows.

$k_d = 17$ $k_c = 16$ $d_0 = 2$

According to the first embodiment, when $e_y < 0$, that is, traveling direction deviation $e_y$ is negative. The traveling direction $A\theta_x$ of the moving body 1 is to gather at a certain area. Therefore there is a possibility that the controlling of the moving body 1 may be unstable when the moving body 1 enters into the area. Thereupon the azimuth deviation gain A is considered separately in the case where the traveling direction deviation $e_y$ is 0 or positive and the same is negative, and the azimuth deviation gain A in the respective cases are made to be F and G. And the respective azimuth deviation gain F and G are made to be the functions shown in the following equations (9) and (10).

When $e_y \geq 0$ $$\theta_x = \tan^{-1}(e_x/e_y) \qquad (>0)$$

$$A = F = \frac{R(\text{const} + R)}{0.5 + R^2} \qquad (9)$$

When $e_y < 0$ $$\theta_x = \tan^{-1}(e_x/e_y) - \pi \qquad (>0)$$

$$A = G = \frac{R^2}{0.5 + R^2} \qquad (10)$$

Figure 8:
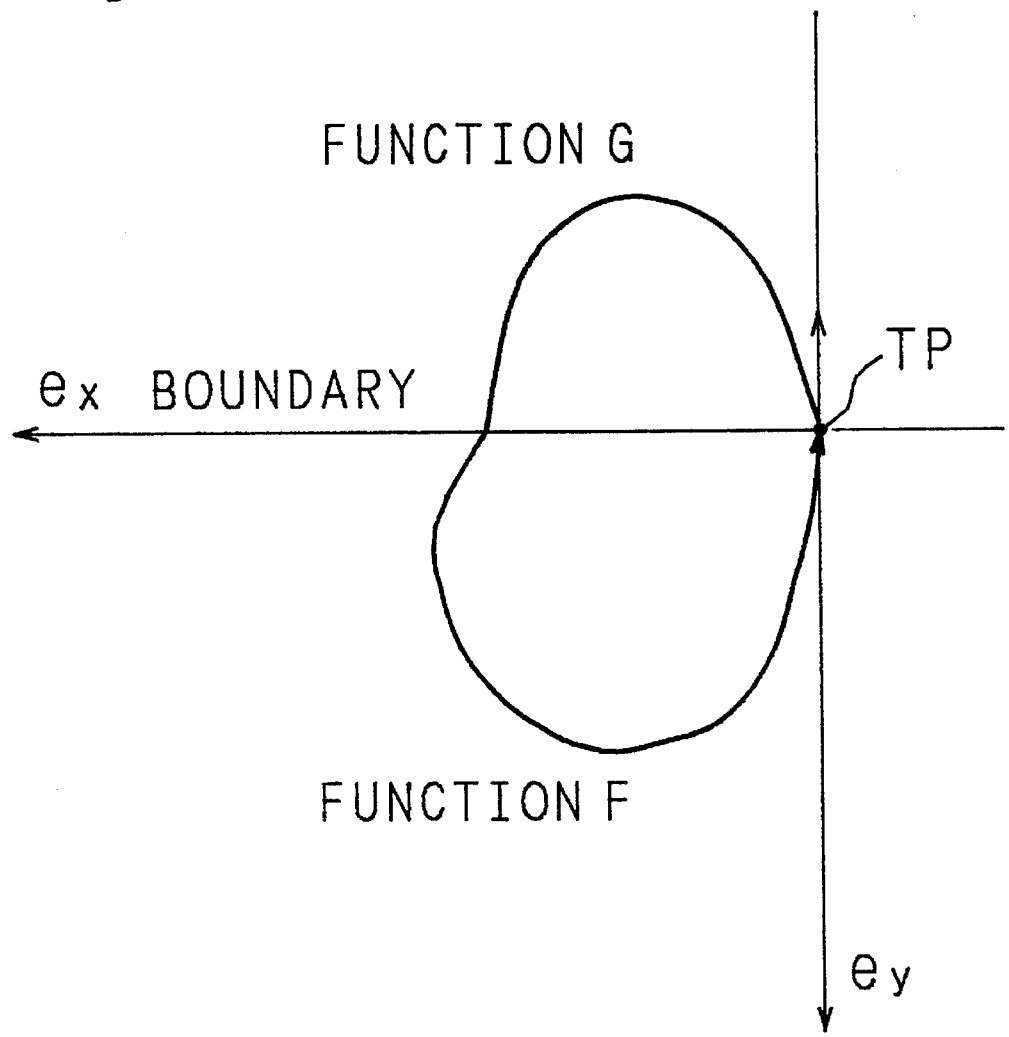
FIG. 8 is a schematic diagram showing a boundary of the two kinds of functions.

But when such azimuth deviation gain A is as abovementioned is determined as functions F and G being different from each other responsive to positive and negative of the traveling direction deviation $e_y$, as shown in FIG. 8, the functions F and G are switched with the $e_y$ axis being as a boundary.

And according to the first embodiment, the stopping accuracy of the moving body 1 at the target position TP is considerably high when the starting position is relatively far from the target position TP shown in FIG. 5 and FIG. 6. But when the starting point of the moving body 1 is relatively close to the target position TP, the stopping accuracy of the moving body 1 at the target position TP is not as high as compared with the case where the starting position is relatively far from the target position TP.

Figure 9:
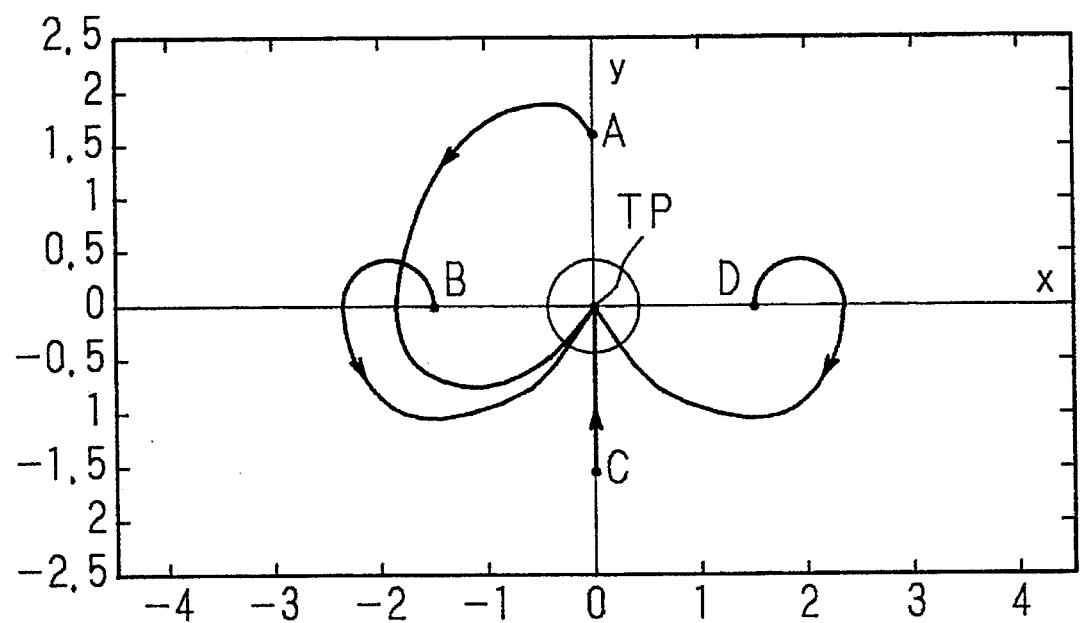
FIG. 9 is a schematic diagram showing the direction control result at the target position in the case where the starting position of the moving body is relatively close to the target position.

FIG. 9 shows the examination result of time case, for example, where the starting positions A, B, C and D of the moving body 1 are 1.5 meters from the target position TP respectively and the azimuth at the respective starting position is 0° (positive direction of y axis). In this examination result, the stopping direction does not coincide with the designating direct ton (positive direction of y axis) at the target position TP in each case where the moving body 1 starts from the respective starting position A, B and D except when it starts from the starting point C being a negative position on the y axis.

Figure 10:
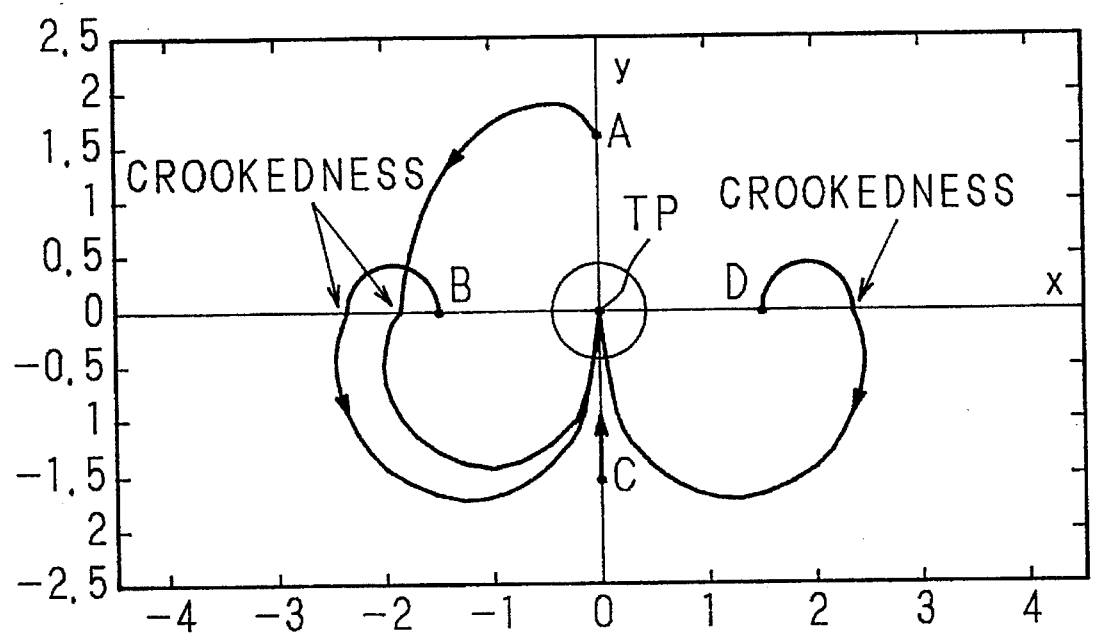
FIG. 10 is a schematic diagram showing that the boundary of the two kinds of functions changes suddenly by changing one function.

In order to solve such a problem, a constant const of the function F might be made larger. But when the const is so made, as shown in the examination result obtained in the same condition as the case of FIG. 9 in FIG. 10, the azimuth of the moving body 1 changes suddenly at the boundary of the two functions F and G and the traveling locus thereof is crooked. In such a case where the traveling locus of the moving body 1 changes suddenly, a dangerous situation exists, for example, in which goods loaded on the moving body 1 falls.

Accordingly, it is necessary to set the two functions F and G so that they connect smoothly with each other at their connecting point. In the following, an explanation is given on the routeless guiding method for the moving body related to the second embodiment of the present invention capable of connecting such functions F and G smoothly.

Figure 11:
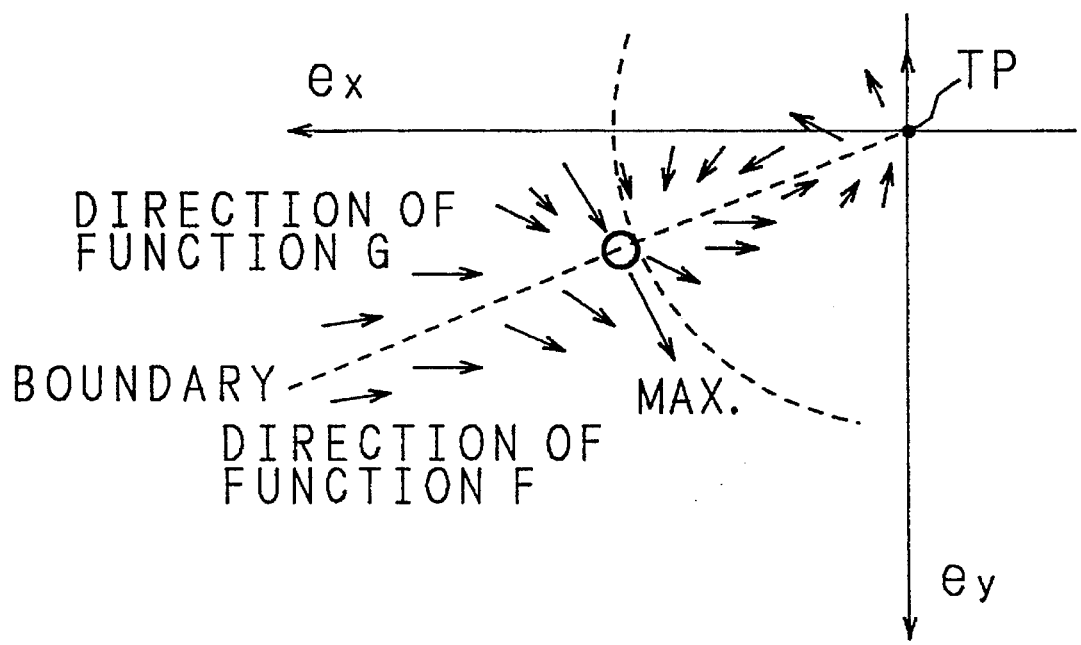
FIG. 11 is a schematic diagram showing a concept of the method for routeless guiding method for the moving body related to the second embodiment of the present invention.
Figure 12:
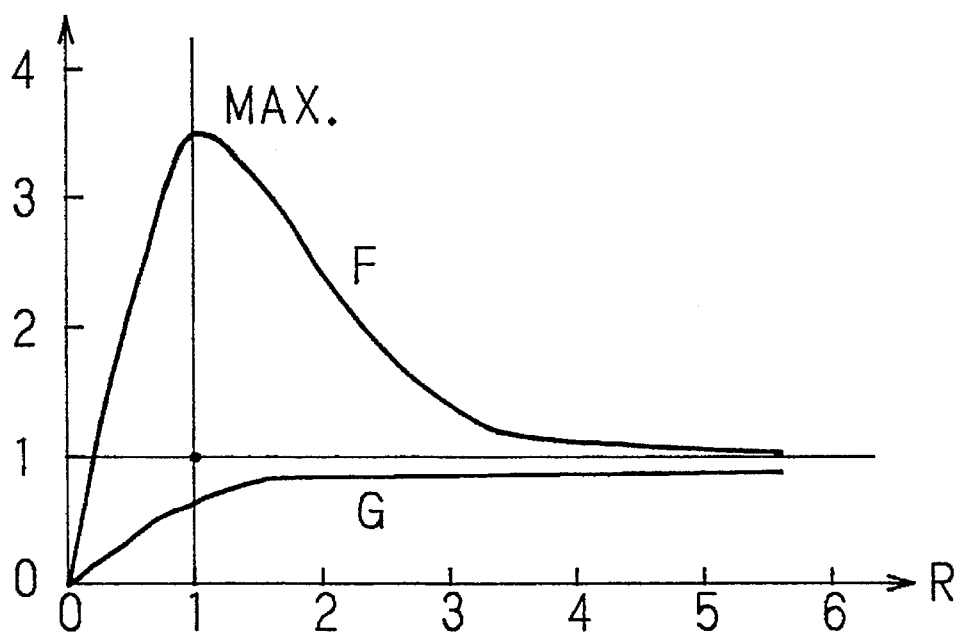
FIG. 12 is a graph showing characteristics of the two kinds of functions F and G used in the routeless guiding method for a moving body related to the second embodiment.

At first, as shown in FIG. 11, a setting, by which the traveling direction of the moving body 1 is orthogonal to the boundary of the two functions when R=1, is carried out. In addition, as shown in FIG. 12, respective settings are performed so that the function F takes the maximum value and on the other hand the function G decreases uniformly.

In consideration of such conditions, the two functions F and G are respectively determined to be like following equations (11) and (12) from the aforesaid equations (9) and (10).

$$F = \frac{R(b+R)}{a+R^2} \quad (11)$$

$$G = \frac{R(c+R)}{a+R^2} \quad (12)$$

Hereupon, the condition that the function F takes the maximum value at R=1, it is necessary that dF/dR=0, as shown in the following equation (13) when R=1.

$$\frac{dF}{dR} = \frac{b-2a-ab}{(a+1)^2} \quad (13)$$

Here, when the denominator of the equation (13) is not 0, that is, $(a+1)^2 \neq 0$, the relation between the variables a and b in the equation (13) is as shown in the following equation (14).

$$b=2a/(1-b) \quad \ldots (14)$$

Figure 13:
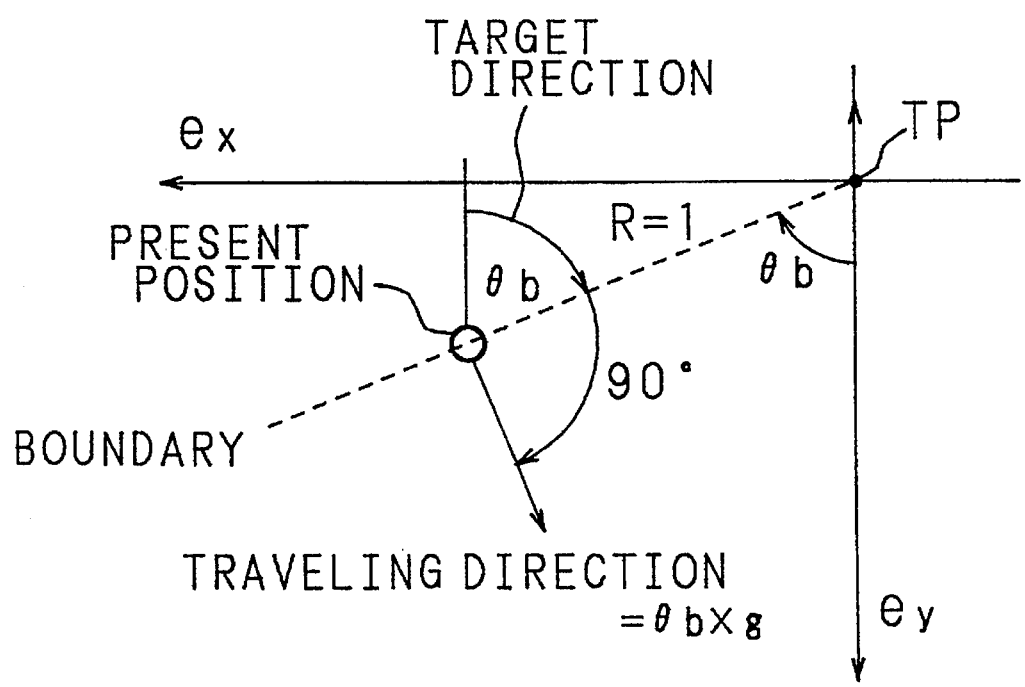
FIG. 13 is a schematic diagram showing an angle made by the traveling direction of the moving body in the area of the function F and the boundary of the two functions, and FIG. 14 ia a schematic diagram showing an angle made by the traveling direction of the moving body in the area of the function G and the boundary of the two functions.

The condition by which the traveling direction of the moving body 1 is orthogonal to the boundary of the two functions F and G is shown in the following when R=1. In addition, as a value (the maximum value f) of the function F when R=1, a predetermined value is given. An angle of the boundary of the two functions F and G is assumed to be $\theta_b$, $\theta_b$ and is determined from FIG. 13 by the following equation (15).

$$\theta_b = 90(f-1) \quad \ldots (15)$$

Figure 14:
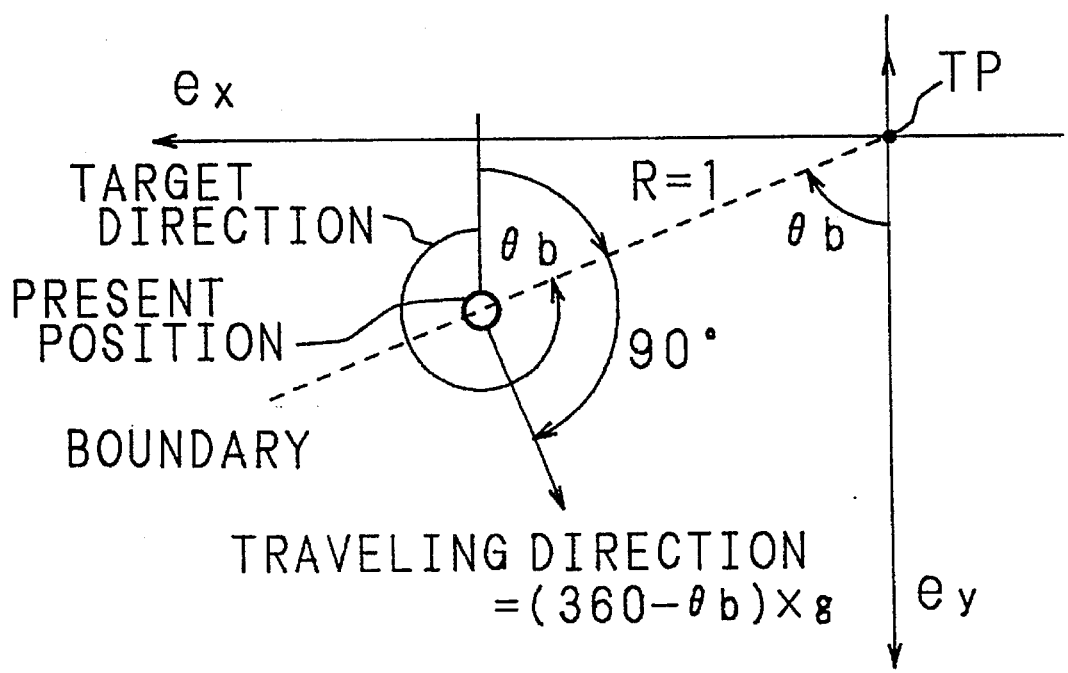

In the same way, the value g of the function F when R=1, is determined from FIG. 14 by the following equation (16).

$$g=(270-\theta_b)/(360-\theta_b) \quad \ldots (16)$$

From the mentioned above, the variables a and b are determined. That is, as the value obtained by substituting R=1 into the aforesaid equation (12) equals f, the following equation (17) is established.

$$(b+1)/(a+1)=f \quad \ldots (17)$$

When the value of b of the aforesaid equation (14) is substituted into the equation (17), a is determined by the following equation (18).

$$a=1-(1/f) \quad \ldots (18)$$

Further, as the value obtained by substituting R=1 into the aforesaid equation (13) equals g, c is determined by the following equation (19).

$$c=(a+1) \cdot g-1 \quad \ldots (19)$$

To put the mentioned above in order, the functions F and G of the two azimuth deviation gains are determined as mentioned in the following.

R:to be calculated at each sampling time
f:to be inputted as a design parameter $$\left. \begin{array}{l} \theta_b = \dfrac{90}{f-1} \\[4pt] g = \dfrac{270-\theta_b}{360-\theta_b} \\[4pt] a = 1 - \dfrac{1}{f} \\[4pt] b = \dfrac{2a}{1-a} \\[4pt] c = (a+1) \cdot g - 1 \end{array} \right] \begin{array}{l} \text{to be determined as} \\ \text{initial values when} \\ \text{the design parameter} \\ f \text{ is given} \end{array}$$

$$\left. \begin{array}{l} F = \dfrac{R(b+R)}{a+R^2} \\[4pt] G = \dfrac{R(c+R)}{a+R^2} \end{array} \right] \begin{array}{l} \text{to be calculated at} \\ \text{each sampling time} \end{array}$$

As aforementioned, according to the routeless guiding method for the moving body related to the second embodiment it is not necessary to set the route of the moving body and when the moving body is moved between n points, the traveling direction of the moving body at the target position is coincided with the predetermined direction only by designating the coordinates of the n points. Accordingly, a user program becomes easy and the time required for programming is reduced.

And as a route setting is not required, it is not necessary to calculate a spline curve by a control circuit of the moving body, and a load of the CPU is reduced.

Further, even after steering clear of an obstacle on the traveling route, it is possible for the moving body to arrive at the target position automatically, and it is possible to travel to the target position even in the case where a route could not have been designated in advance in the past. Further, it is possible to travel to the target position even in the case where a route has not existed in the past, and at the target position, the moving body is controlled to travel in the traveling direction being at that point.

Still further, according to the second embodiment, even when the starting point of the moving body is relatively close to the target position, controlling accuracy of the traveling direction of the moving body at the target position is improved and the traveling route of the moving body at the transition point of the two kinds of gains of parameter is made smooth so as to be capable of avoiding a sudden direction change.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A routeless guiding method for guiding a moving body having independently controlled right and left wheels comprising the steps of:

independently controlling the driving speeds of said right and left driving wheels to direct movement of the body from a present position of the body to a target position without designating a route according to an operational expression including a parameter based on a positional relation between the body present position and the target position, and making a traveling direction of said moving body coincide with a predetermined direction at said target position, changing a gain of said parameter of said operational expression responsive to a distance between the present position of said moving body and the said target position.

2. A routeless guiding method as in claim 1 wherein said right and left wheels are controlled according to the operational expression;

$$u_r, 1 = k_d e_d \pm k_c(e_c - A\theta_x)$$

Where, $e_d$: positional deviation $$e_d = \sqrt{e_x^2 + e_y^2}$$

$\theta_x$: azimuth deviation
$\theta_x = \tan^{-1}(e_x/e_y)$
$u_r$: right motor speed command value
$u_l$: left motor speed command value
$k_c$: azimuth gain
$k_d$: deviation direction gain
$e_c$: turning direction deviation
A: azimuth deviation gain and wherein said gain A of said parameter $\theta_x$ is said gain included in said operational expression changed responsive to a distance D between the present position of said moving body and the said target position such that When D>>1 : A=1
When D=1 : A=2
When D≡1 : A=0
and where D:$e_d/d_0$.

3. A routeless guiding method for guiding a moving body, whose driving speeds of the right and left driving wheels are independently controlled according to an operational expression including a parameter based on a positional relation between the body present position and the target position without designating a route, and making a traveling direction of said moving body coincide with a predetermined direction at said target position, changing a gain of said parameter of said operational expression responsive to a distance between the present position of said moving body and the said target position, and said gain of said parameter being of two kinds determined respectively so that the change of traveling route of said moving body at a switching point from one gain to another is smooth.

4. A routeless guiding method for guiding a moving body having independently controllable right and left wheels, comprising the steps of independently controlling the driving speeds of said right and left driving wheels according to an operational expression including a parameter based on a positional relation between the body present position and the target position without designating a route, and making a traveling direction of said moving body coincide with a predetermined direction at said target position, the operational expressing being $$u_r, 1 = k_d e_d \pm k_c(e_c - A\theta_x)$$

where, $e_d$: positional deviation $$e_d = \sqrt{e_x^2 + e_y^2}$$

$\theta_x$: azimuth deviation
$\theta_x = \tan^{-1}(e_x/e_y)$
$u_r$: right motor speed command value
$u_l$: left motor speed command value
$k_c$: azimuth gain
$k_d$: deviation direction gain
$e_c$: turning direction deviation
A: azimuth deviation gain and wherein said gain A of said parameter $\theta_x$ is said gain included in said operational expression changed responsive to a distance D between the present position of said moving body and the said target position such that When D>>1 : A=1
When D=1 : A=2
When D≡1 : A=0
where D:$e_d/d_0$
and
the gain A of said parameter is of two kinds as follows, When $e_y \geq 0$ $\theta_x = \tan^{-1}(e_x/e_y)$ (>0)

$$A = F = \frac{R(\text{const} + R)}{0.5 + R^2}$$

When $e_y < 0$ $\theta_x = \tan^{-1}(e_x/e_y) \pi$ (>0)

$$A = G \frac{R^2}{0.5 + R^2}$$

and said gains F and G are determined respectively as follows so that the traveling route of said moving body at a switching point from one gain to another gain is smooth:

$$F = \frac{R(b + R)}{a + R^2}$$
$$G = \frac{R(c + R)}{a + R^2}$$
to be calculated at each sampling time R: is calculated at each sampling time f: is inputed as a design parameter $$\theta_b = \frac{90}{f - 1}$$
$$g = \frac{270 - \theta_b}{360 - \theta_b}$$
$$a = 1 - \frac{1}{f}$$
$$b = \frac{2a}{1 - a}$$
$$c = (a + 1)g - 1.$$

to be determined as initial values when the design parameter f is given

* * * * *

UNITED STATES PATENT AND TRADEMARK OFFICE
CERTIFICATE OF CORRECTION

PATENT NO.   : 5,471,385
DATED        : November 28, 1995
INVENTOR(S)  : Kenshi SUZUKI et al.

It is certified that error appears in the above-indentified patent and that said Letters Patent is hereby corrected as shown below:

Column 8, line 58, claim 1, change "left wheels" to -- left driving wheels --

Column 9, line 10, claim 2, change "$u_{r,1} = k_d e_d \pm k_c(e_c - A\theta_x)$" to -- $u_{r,1} = k_d e_d \pm k_c (e_c - A\theta_x)$ --

Column 10, line 38, claim 4, change "$\theta_x = \tan^{-1} (e_x/e_y) \, \pi \, (>0)$" to -- $\theta_x = \tan^{-1} (e_x/e_y) - \pi \, (>0)$ --

Signed and Sealed this

Twenty-first Day of May, 1996

Attest:

BRUCE LEHMAN

*Attesting Officer*   *Commissioner of Patents and Trademarks*